Sept. 29, 1970  F. VIART  3,531,612

MEANS FOR HEATING BY INDUCTION

Original Filed Aug. 29, 1966  3 Sheets-Sheet 1

INVENTOR
Fernand VIART

ATTORNEY

Sept. 29, 1970 F. VIART 3,531,612

MEANS FOR HEATING BY INDUCTION

Original Filed Aug. 29, 1966 3 Sheets-Sheet 2

*INVENTOR*
Fernand VIART

*ATTORNEY*

INVENTOR
Fernand VIART

ATTORNEY

United States Patent Office 3,531,612
Patented Sept. 29, 1970

3,531,612
MEANS FOR HEATING BY INDUCTION
Fernand Viart, Marcinelle, Belgium, assignor to Ateliers de Constructions Electriques de Charleroi (ACEC), Brussels, Belgium, and Vallourec, Paris, France
Original application Aug. 29, 1966, Ser. No. 575,750, now Patent No. 3,472,987, dated Oct. 14, 1969. Divided and this application Nov. 21, 1968, Ser. No. 777,729
Int. Cl. H05b 5/00; B23k 13/02
U.S. Cl. 219—8.5     3 Claims

ABSTRACT OF THE DISCLOSURE

This invention relates to means for the induction heating of the adjacent edges of a metallic element wherein the metallic element is folded to define the adjacent edges. The means comprises at least two inductors placed side-by-side at a certain distance from one another and surrounding the metallic element in a plane perpendicular to the longitudinal direction of the element. The inductors are connected to one or more electric current sources of suitable frequency in such a way that two adjacent inductors are fed with electric currents in phase opposition.

---

Figure 1:
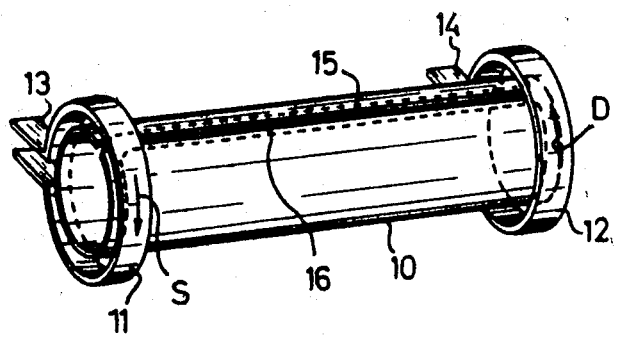

The present application is a division of application No. 575,750, filed Aug. 29, 1966.

The present invention relates to means permitting adjacent metallic edges to be heated by induction.

By means for induction heating, it is to be understood means that use electric currents at a suitable frequency which can vary from some thousands of cycles per second (medium frequency currents) to several hundreds of kilocycles per second or more (radio frequency currents). It is already known to use means comprising one or more longitudinal inductors which are disposed along the edges to be heated and induce in these edges secondary currents that bring them to the desired temperature.

In practice, however, various disadvantages are met when using longitudinal inductors, particularly when they are used for continuous heating processes, in which the metallic edges to be heated move along in proximity to the inductors. Apart from the fact that the longitudinal inductors are subjected throughout their length to heat radiations of the heated edges, it is essential, if it is desired to obtain a uniform effect, for the geometric characteristics of the assembly comprising inductors and edges to remain constant. This condition is not always satisfied in the industrial installations, which causes variations in the quality of the manufactured products obtained by these processes.

It is also known, particularly in connection with the manufacture by continuous processes of longitudinally welded tubes by adjacent edges of a strip being brought together and welded, to use means comprising a circular inductor surrounding the previously curved strip, which inductor induces secondary currents which are developed in the back of the strip and are closed along the edges to be heated and by the welding point.

In certain practical cases, however, such means cannot be used, either because the heating operation is not intended for preparing a welding operation, in which case there is no common point between the two edges to be heated, or because it is found to be necessary to position the inductor at such a distance from the point of contact that the desired heat effect is not achieved.

The present invention is concerned with heating means which enable two adjacent metallic edges to be heated by induction, avoiding the use of longitudinal inductors and overcoming certain disadvantages inherent in inductors placed tranversely of the edges to be heated.

In accordance with the invention, the means by which at least two adjacent edges of at least one metallic element are heated by induction are characterised in that they comprise at least two inductors placed side-by-side at a certain distance from one another and surrounding the metallic element or elements in a plane transverse to the longitudinal direction of the said element or elements and connected to one or more electric current sources of suitable frequency in such a way that two adjacent inductors are fed with electric currents in phase opposition.

In accordance with the invention, the means for heating by induction at least two adjacent edges of at least one metallic element are also characterised in that they comprise inductors placed side-by-side at a certain distance from one another and surrounding the metallic element or elements in a plane transverse to the longitudinal direction of the said element or elements, each of these inductors being connected to a source of electric currents at suitable frequency so that two adjacent inductors are fed with electric currents in phase opposition.

Such means for heating adjacent edges of a metallic blank in the form of a sleeve are illustrated in FIG. 1 of the accompanying drawing. In this figure, 10 represents the sleeve-like metallic blank which is surrounded, perpendicularly of the longitudinal axis of the latter, by two circular indicators 11 and 12. These inductors are connected at 13 and 14 to electric current sources of suitable frequency, which supply currents in phase opposition, so that the electric currents supplied by the source connected at 14 are out of phase by 180° with respect to those delivered by the source connected at 13, this phase shift being symbolised by the arrows S and D shown in the drawing.

It is obvious that the electric current sources connected at 13 and 14 must be synchronous in order to respect the phase shift of the electric currents between the two inductors 11 and 12.

By an appropriate choice of the distance between the two inductors 11 and 12, as a function of the nature of the metal of the sleeve 10, the diameter of the latter and the frequency of the electric supply currents, the currents induced in the sleeve 10 by the inductors, opposite each inductor, are developed along the circuit indicated by a broken line in FIG. 1, that is to say, they follow the two adjacent edges 15 and 16 (the currents induced along the edge 15 being in an opposite direction to those along the edge 16), where they are concentrated, thus bringing the edges 15 and 16 to the required temperature.

One particular advantage of the means in accordance with the present invention, particularly in continuous manufacturing processes requiring the generation in the metallic edges of a large quantity of energy in order to bring the said edges to the required temperature, resides in the possibility of using as large a number of inductors as may be necessary, the edges to be heated moving along in said inductors.

Figure 2:
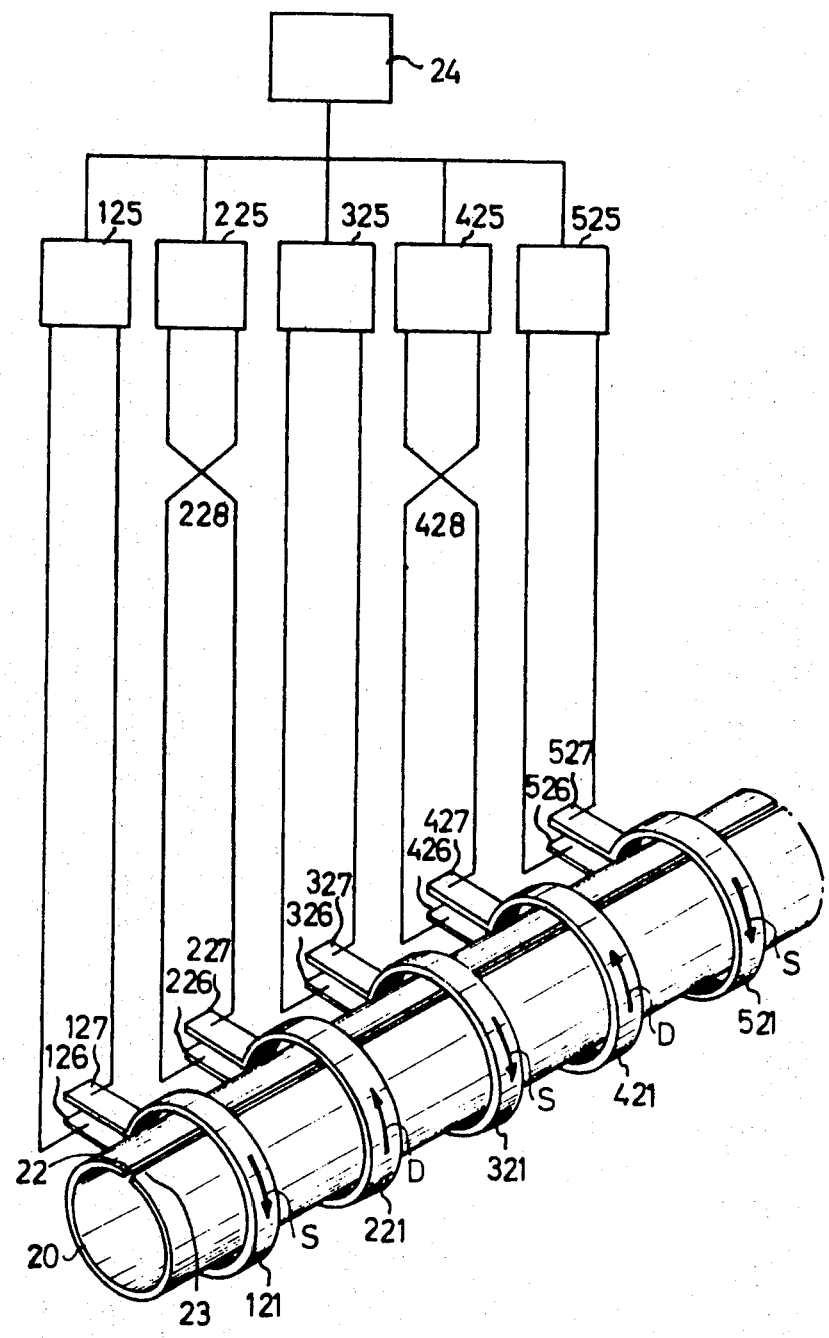

Such an embodiment of the means in accordance with the invention for the continuous manufacture of a tube welded longitudinally by bringing together and welding the adjacent edges of a strip is illustrated in FIG. 2 of the accompanying drawings. In this figure, 20 represents a curved strip which moves successively through, for example, five circular inductor 121, 221, 321, 421 and 521; after heating to the required temperature, the edges 22 and 23 are brought together by a forging device (not shown) which is disposed after the inductor 521 in the direction of movement and are welded together.

The electric energy supply installation comprises, for example, when it is a question of high-frequency electric current a pilot oscillator 24 which controls five power generators 125, 225, 325, 425 and 525; the control of the five generators 125 to 525 by the pilot oscillator 24 ensures that the currents generated by the power oscillators are in perfect phase agreement. The inductors 121 to 521 are connected to the power generators 125 to 525 by connections 126 and 127 for the inductor 121, connections 226 and 227 for the inductor 221, connections 326 and 327 for the inductor 321, connections 426 and 427 for the inductor 421 and connections 526 and 527 for the inductor 521, the connections to the inductors 221 and 421 being however crossed at 228 and 428, so that the electric currents in the inductors have the direction represented by the arrows S and D, two successive inductors being fed by electric currents in phase opposition.

The use of inductors surrounding the metallic elements of which the edges are to be heated and which are disposed in a plane perpendicular to the longitudinal direction of these elements, or transverse inductors, have the advantage by comparison with longitudinal inductors that the constancy of the geometric characteristics of the inductor-edge assembly is not so imperative.

In addition, the formation of the transverse inductors according to the invention is more simple than that of longitudinal inductors, particularly on account of their design and the much weaker thermal stressing to which they are subjected.

According to one particular embodiment in accordance with the invention, the means for heating by induction at least two adjacent edges of at least one metallic element is characterised in that it comprises inductors placed side-by-side at a certain distance from one another and surrounding the metallic element or elements in a plane perpendicular to the longitudinal direction of the said element or elements, these inductors bing connected in series with a single source of electric currents at suitable frequency, two adjacent inductors being connected together with a crossing of connections and the electric current source being connected to the first inductor and to the last inductor, so that two adjacent inductors are fed with electric currents in phase opposition.

Figure 3:
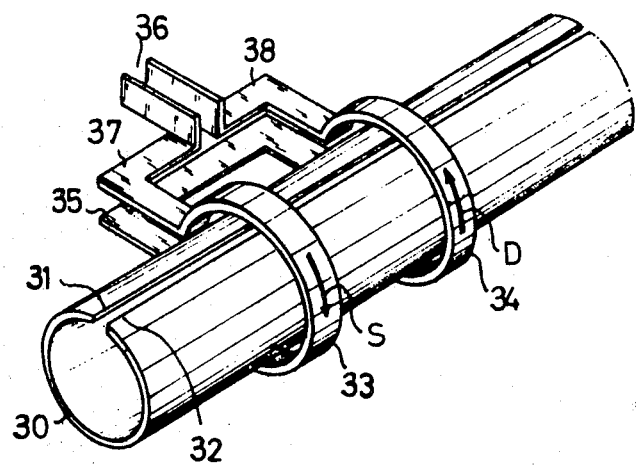

Such an arrangement is illustrated in FIG. 3 of the accompanying drawings, which shows at 30 a strip which is curved in such a way as to provide two adjacent edges 31 and 32; the strip 30 is surrounded by two circular inductors 33 and 34, of which the lower parts are connected to one another by a connection 35, while the upper parts are connected at 36 to the electric current source by the connections 37 and 38.

The currents in the inductors 33 and 34 are of opposite direction because of the reversing of the connections and have the direction indicated by the arrows S and D in the figure; the induced currents consequently follow the edges 31 and 32 of the strip 30.

According to another particular constructional form in accordance with the invention, the means for heating by induction at least two adjacent edges of at least one metallic element are characterised in that they comprise at least a first inductor and a last inductor placed side-by-side at a certain distance from one another and surrounding the metallic element or elements in a plane perpendicular to the longitudinal direction of the said element or elements, the first inductors being formed of two semi-inductors, these inductors being connected to a single source of electric currents at suitable frequency, the last inductor being connected to the electric current source through the first semi-inductors, in such a way that two adjacent inductors are fed with electric currents in phase opposition.

Figure 4:
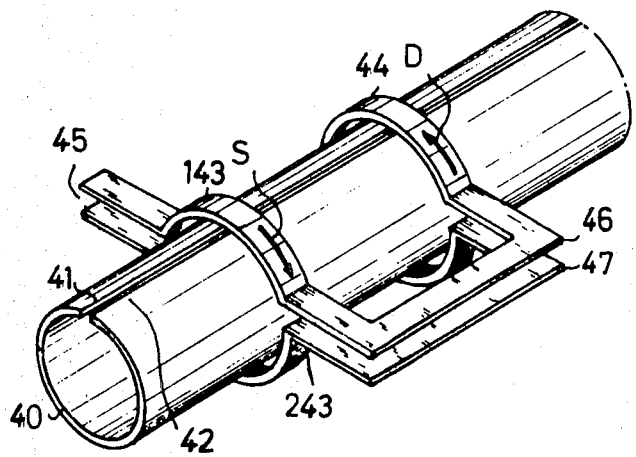

Such an arrangement is shown in FIG. 4 of the accompanying drawings, in which 40 represents a strip curved so as to provide two adjacent edges 41 and 42; the strip is surrounded, for example, firstly by two semi-inductors 143 and 243 and secondly by one inductor 44; the electric current source of suitable frequency being connected at 45, these currents circulate in the semi-inductor 143, in the connection 46, in the inductor 44, in the connection 47 and finally in the semi-inductor 243.

The electric currents in the inductors (143–243) and 44 have the direction indicated by the arrows S and D in the figure; the induced currents consequently follow the edges 41 and 42 of the strip 40.

According to another constructional form, the means for heating by induction at least two adjacent edges of at least one metallic element are characterised by comprising inductors placed side-by-side at a certain distance from one another and surrounding the metallic elements in a plane perpendicular to the longitudinal direction of the said element or elements, two adjacent inductors of at least one group of inductors being connected together with a crossing of connections, at least one electric current source of suitable frequency being connected to the inductors and to the first inductor and to the last inductor of each inductor group, so that two adjacent inductors are fed with electric currents in phase opposition.

According to another constructional form, the means for heating by induction at least two adjacent edges of at least one metallic element are characterised by comprising inductors placed side-by-side at a certain distance from one another and surrounding the metallic elements in a plane perpendicular to the longitudinal direction of the said element or elements, at least one group of inductors comprising at least a first inductor and a last inductor, the first inductors being formed of two semi-inductors, at least one electric current source of suitable frequency being connected to the inductors and to the last inductor of each inductor group through the first semi-inductors of this group, in such a way that two adjacent inductors are fed with electric currents in phase opposition.

According to a last constructional form, the means for heating by induction at least two adjacent edges of at least one metallic element are characterised by comprising inductors placed side-by-side at a certain distance from one another and surrounding the metallic elements in a plane perpendicular to the longitudinal direction of the said element or elements, two adjacent inductors of at least one first group of inductors being connected together with a crossing of connections, and at least one second group of inductors comprising at least a first inductor and a last inductor, the first inductors of this second inductor group being formed of two semi-inductors, at least one electric current source being connected to the inductors, to the first inductor and to the last inductor of each first inductor group and to the last inductor of each second inductor group through the first semi-inductors of this same group, in such a way that two adjacent inductors are traversed by electric currents in phase opposition.

Such arrangements combine between them the constructional forms which are illustrated by FIG. 2, 3 and 4 of the accompanying drawings.

Figure 5:
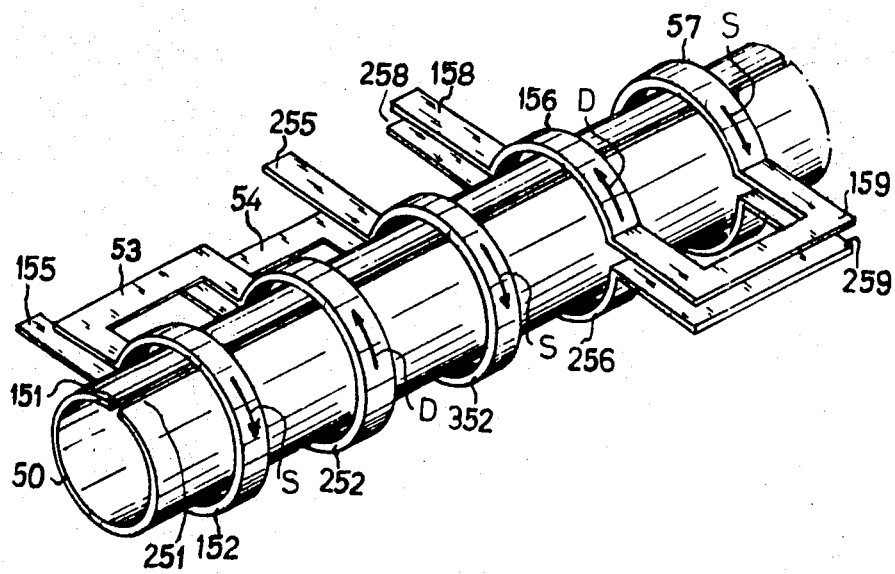

FIG. 5 of the accompanying drawings represents one example of such a combination. In this figure, 50 represents a strip curved in such a way as to present two adjacent edges 151 and 251; the strip 50 is surrounded, for example, in the first place by three inductors 152, 252 and 352; the upper parts of the inductors 152 and 252 are connected together by a connection 53, while the lower parts of the inductors 252 and 352 are connected together by a connection 54; a first electric current source of suitable frequency is connected at 155 and 255 to this first group of inductors 152–252–352. In this manner, the inductors 152, 252 and 352 are traversed by electric currents which have the direction indicated by the arrows S and D in the figure and which are thus in phase opporsition.

The strip 50 is then for example surrounded by two semi-inductors 156 and 256 and by an inductor 57; a second electric current source of suitable frequency is connected at 158 and 258 and feeds the inductor 57, through the semi-inductors 156 and 256, by means of connections 159 and 259. In this manner, the inductors 156–256 and 57 are traversed by electric currents which have the direction indicated by the arrows S and D in the drawing and which are thus in phase opposition.

If the geometrical and electrical characteristics of the arrangement are such that the joint action of two adjacent inductors of two inductor groups has an effect on the edges to be heated, it will be expedient in this case to ensure that the phases of these two inductors are in opposition. In the contrary case, for example, if the distance between these two inductors is not too great, the phase of currents in these two inductors could be of any desired type.

It is obvious that, in accordance with a technique which is known per se, the means for heating by induction and described above can be used together with controlled or uncontrolled magnetic cores, modifying the characteristics of the circuit of the induced currents and particularly the impedance of this circuit.

Similarly, it is obvious that the means as above described are applicable to any form of heating by induction, whether this is particularly a static procedure or a question of continuous production; they are applicable to ferrous and non-ferrous metallic materials and also when the metallic elements are treated from the cold state or when they have been subjected to a previous preheating.

Without departing from the scope of the present invention, any technological modification obvious to the expert in the field or arising from the state of the art can be applied to the means as hereinbefore described.

I claim:

1. Induction heating apparatus for heating adjacent longitudinal edges of a metallic workpiece arranged in slightly spaced relation, comprising at least two loop inductors and means connecting said loop inductors in phase opposition from one inductor to the adjacent inductor to at least one source of high frequency currents, said loop inductors being disposed transversely to the workpiece and longitudinally spaced from each other to bias the induced current flow in a natural closed circuit in the workpiece underneath the inductors and along the adjacent edges of the workpiece said connecting means being located at a sufficient distance from the workpiece so that no substantial induction of current in the workpiece is effected.

2. Induction heating apparatus for heating adjacent longitudinal edges of a metallic workpiece arranged in slightly spaced relation, comprising at least two loop inductors and means including a crossing of connections for connecting said loop inductors in phase opposition to one source of high frequency currents, said loop inductors being disposed transversely to the workpiece and longitudinally spaced from each other to bias the induced current flow in a natural closed circuit in the workpiece underneath the inductors and along the adjacent edges of the workpiece, said connecting means being located at a sufficient distance from the workpiece so that no substantial induction of currents in the workpiece is effected.

3. Induction heating apparatus for heating adjacent longitudinal edges of a metallic workpiece arranged in slightly spaced relation, comprising at least one first loop inductor being formed of two semi-inductors, and a last loop inductor, and means including a crossing of connections between said last inductor and said two semi-inductors for connecting said first loop inductor and said last loop inductor in phase opposition to one source of high frequency currents, said loop inductors being disposed transversely to the workpiece and longitudinally spaced from each other to bias the induced current flow in a natural closed circuit in the workpiece underneath the inductors and along the adjacent edges of the workpiece, said connecting means being located at a sufficient distance from the workpiece so that no substantial induction of currents in the workpiece is effected.

References Cited
UNITED STATES PATENTS 2,852,649   9/1958   Limpel _____ 219—8.5

JOSEPH V. TRUHE, Primary Examiner

L. H. BENDER, Assistant Examiner

U.S. Cl. X.R.

219—10.41, 10.53